United States Patent [19]
Dillard et al.

[11] Patent Number: 5,214,314
[45] Date of Patent: May 25, 1993

[54] ELECTRICAL DISTRIBUTION BUSWAY AND BUS PLUG ARRANGEMENT

[75] Inventors: William T. Dillard; Robert W. Morgan, both of Spartanburg, S.C.

[73] Assignee: Siemens Energy & Automation, Inc., Alpharetta, Ga.

[21] Appl. No.: 968,219

[22] Filed: Oct. 29, 1992

Related U.S. Application Data

[63] Continuation of Ser. No. 715,517, Jun. 14, 1991, abandoned, which is a continuation-in-part of Ser. No. 359,258, May 31, 1989, Pat. No. 5,053,637, and a continuation-in-part of Ser. No. 504,094, Mar. 30, 1990, Pat. No. 5,151,043, which is a continuation of Ser. No. 288,530, Dec. 22, 1988, abandoned.

[51] Int. Cl.$^5$ .............................................. H02B 1/00
[52] U.S. Cl. ...................................... 307/147; 307/42
[58] Field of Search ...................... 361/11, 12, 17, 38, 361/42, 64, 147, 149

[56] References Cited

U.S. PATENT DOCUMENTS

| | | | |
|---|---|---|---|
| 2,306,353 | 12/1942 | Cole et al. | 361/378 |
| 2,585,770 | 2/1952 | Hammerly | 361/378 |
| 2,798,172 | 7/1957 | Jones | 307/147 |
| 3,263,131 | 7/1966 | Rowe | 439/212 |
| 3,383,458 | 5/1968 | Raskhodoff et al. | 439/212 |
| 3,391,378 | 7/1968 | Fisher | 439/212 |
| 3,781,567 | 12/1973 | Papsco | 307/147 |
| 3,922,053 | 11/1975 | Hafer | 439/114 |
| 4,082,393 | 4/1978 | Gamble | 439/110 |
| 4,146,285 | 3/1979 | Cook | 439/213 |
| 4,203,053 | 5/1980 | Shepard | 307/147 |
| 4,367,417 | 1/1983 | Cassanta | 307/147 |
| 4,395,640 | 7/1983 | Bone | 307/147 |
| 4,714,431 | 12/1987 | McGoldrick et al. | 439/212 |
| 4,758,172 | 7/1988 | Richards et al. | 439/212 |
| 5,043,531 | 8/1991 | Guteson et al. | 307/147 |
| 5,053,637 | 10/1991 | Dillard | 307/147 |

OTHER PUBLICATIONS

"Architectural Power Systems" Manufactured by American Modular Systems Design, Inc., P.O. Box 156, Hudson, N.H. 03051.

Marketing brochure from Nat'l Electrical Manufacturers Assoc., "Busway, The Modern Way to Power Distribution" (1986); pp. 1-19, 2101.

Bulletin from Siemens Energy & Automation, Inc., "I-T-E XJ-L Busway Systems" (1988) pp. 1-17, Bulletin, 5.3-1D.

Siemens-Allis, I-T-E XJ-L Busway System, Selection and Application Guide, Bulletin, 5.3-1C, pp. 1-8.

*Primary Examiner*—Jeffrey A. Gaffin

[57] ABSTRACT

An electrical power distribution busway and bus plug arrangement useable in an office area. The arrangement includes at least one busway having three power bus bars for carrying electrical power, and isolated ground (or neutral) bus, a neutral bus, and a bonded ground bus. The arrangement also includes a power distribution unit for providing the busway with electrical power, where different qualities of electrical power may be selectively provided to the power bus bars of the busway. The arrangement also includes plug-in assemblies which are electrically engageable with the busways and capable of being configured to selectively provide power from one of the three power bus bars to a sensitive device such as a computer or an insensitive device such as an electrical motor.

26 Claims, 4 Drawing Sheets

ELECTRICAL DISTRIBUTION BUSWAY AND BUS PLUG ARRANGEMENT

RELATED APPLICATIONS

This is a continuation of U.S. patent application Ser. No. 07/715,517, filed Jun. 14, 1991, now abandoned, which in turn is a continuation-in-part of commonly assigned U.S. patent applications Ser. No. 07/359,258, filed on May 31, 1989 ("the '258 application"), now U.S. Pat. No. 5,053,637, and Ser. No. 07/504,094, filed on Mar. 30, 1990 ("the '094 application"), now U.S. Pat. No. 5,151,043 and incorporates the full disclosures of the '258 and '094 applications by reference. The '094 application is a continuation of Ser. No. 07/288,530, filed on Dec. 22, 1988, now abandoned.

TECHNICAL FIELD

This invention relates to a busway system. More particularly, this invention relates to a busway system having plug arrangements selectively associated with the type of electrical power provided to the electrical power conductors within the busway.

BACKGROUND OF THE INVENTION

The '258 application discloses a power supply system for the distribution of electrical power in a computer facility room which includes a plurality of enclosed electrical plug-in busways located beneath the raised floor of the room. The busways are provided with a main power distribution unit, and power is provided from the busways to equipment, such as computers, via a plug-in cable which is plugged into the busway. The power distribution unit may be configured to provide an uninterrupted power supply, an isolation transformer for protecting sensitive equipment such as computers, and filtering. Accordingly, all of the equipment connected to the busway is provided with "high quality" electrical power which is uninterruptable, isolated and filtered. While this arrangement is desirable if all of the equipment connected to the busway is sensitive equipment such as computers, this arrangement can become very costly if such "high quality" electrical power must also be provided to other non-sensitive equipment (e.g. motors, lights, resistive heat) connected to the busway which does not require "high quality" electrical power.

The unnecessary provision of uninterruptable power to all of the equipment connected to a busway requires a larger and more costly uninterrupted power supply at the power distribution unit. Additionally, the provision of isolation and filtering to equipment which does not require this type of power conditioning, requires the use of larger and more costly isolation transformers and filtering circuits in the power distribution unit.

Accordingly, it would be advantageous to provide a busway and busway plug-in arrangement which allows selective provision of "high quality" (conditioned) or "medium quality" (partially conditioned) or "low quality" (non-conditioned) electrical power depending upon the requirements of the equipment connected to an electrical busway. For example, if a sensitive piece of equipment, such as a computer, and a relatively insensitive piece of equipment, such as a fan, are to be connected to a busway, then it would be desirable to provide "high quality" electrical power to the computer via the busway while simultaneously providing "low quality" electrical power to the fan via the same busway.

SUMMARY OF THE INVENTION

The present invention provides an electrical power distribution arrangement. The arrangement includes a busway having a first power conductor and a second power conductor, and a power supply unit electrically coupled to the busway such that a first quality electrical power is supplied to the first power conductor and a second quality electrical power is supplied to the second power conductor. The arrangement also includes first and second electrical conductors, and first and second plugs selectively configured to engage the busway. The first plug couples the first electrical conductor to the first power conductor, and the second plug couples the second electrical conductor to the second power conductor.

The invention further provides an electrical power distribution arrangement including a busway having a first neutral conductor and a second neutral conductor. A power supply unit is electrically coupled to the busway, where the first neutral conductor is isolated from the second neutral conductor such that the potential of the second neutral may deviate from the potential of the first neutral. First and second plugs selectively configured are provided to engage the busway, where the first plug couples a first electrical conductor to the first neutral, and a second plug couples the second electrical conductor to the second neutral.

The present invention further provides an improvement useable in a computer facility of the type having a raised floor supported above a base floor to provide a space therebetween. The improvement includes at least one substantially horizontal busway mounted in the space, where the busway includes a first neutral conductor and a second neutral conductor. A power supply unit electrically coupled to the busway, where the first neutral conductor is isolated from the second neutral conductor such that the potential of the second neutral may deviate from the potential of the first neutral. First and second plugs selectively configured are provided to engage the busway, where the first plug couples a first electrical conductor to the first neutral, and the second plug couples a second electrical conductor to the second neutral.

The present invention further provides an electrical power distribution arrangement including a busway having a housing, a first ground conductor and a second ground conductor, and a power supply unit electrically coupled to the busway. The housing and the first ground conductor are electrically engaged and have the same potential, and the second ground conductor is electrically isolated from the housing such that the potential of the second ground may deviate from the potential of the first ground. The arrangement also includes first and second electrical conductors, and first and second plugs selectively configured to engage the busway. The first plug couples the first electrical conductor to the first ground, and the second plug couples the second electrical conductor to the second ground.

The present invention further provides an improvement useable in a computer facility of the type having a raised floor supported above a base floor to provide a space therebetween. The improvement includes at least one substantially horizontal busway mounted in the space, where the busway includes a first power conductor and a second power conductor. The improvement further includes a power supply unit electrically coupled to the busway such that a first quality electrical power is supplied to the first power conductor and a second quality electrical power is supplied to the second power conductor. First and second plugs are provided to selectively engage the busway, where the first plug couples a first electrical conductor to the first power conductor, and the second plug couples a second electrical conductor to the second power conductor.

The present invention still further provides an improvement useable in a computer facility of the type having a raised floor supported above a base floor to provide a space therebetween. The improvement includes at least one substantially horizontal busway mounted in the space, where the busway includes a housing, a first ground conductor and a second ground conductor. The improvement further includes a power supply unit electrically coupled to the busway, where the housing and the first ground conductor are electrically engaged and have the same potential, and the second ground conductor is electrically isolated from the housing such that the potential of the second ground may deviate from the potential of the first ground. First and second plugs are provided to selectively engage the busway, where the first plug couples a first electrical conductor to the first ground, and the second plug couples a second electrical conductor to the second ground.

BRIEF DESCRIPTION OF THE DRAWINGS

An embodiment of the invention will hereinafter be described in conjunction with the drawings, wherein like designations denote like elements, and.

DETAILED DESCRIPTION OF THE PREFERRED EMBODIMENT

Figure 1:
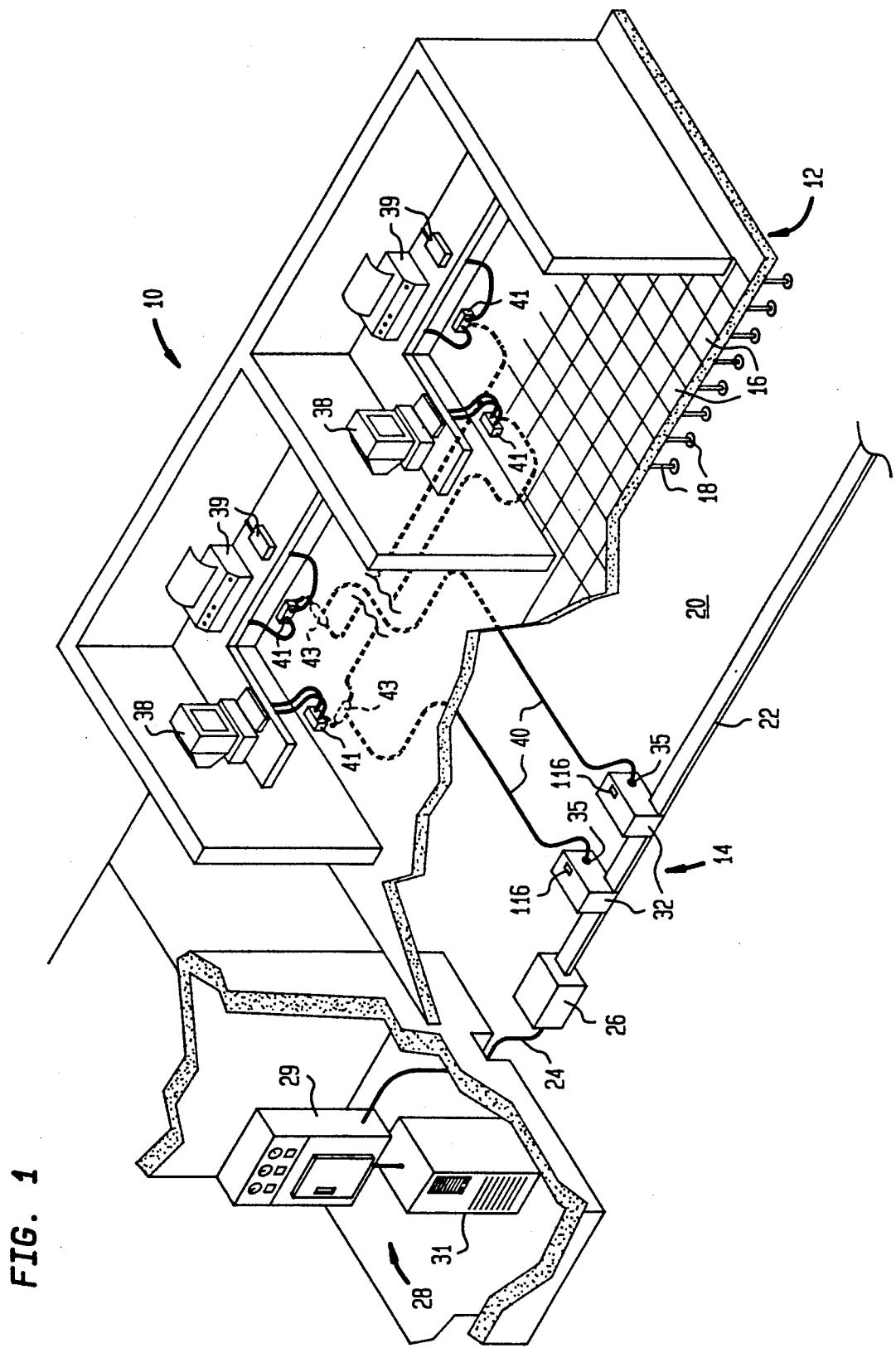
FIG. 1 is an elevated perspective view of an office area including computer stations.

Referring to FIG. 1, an office area 10 includes a raised floor assembly 12 and an electrical power distribution busway arrangement 14. Raised floor assembly 12 may be constructed from individual floor tiles 16 which are supported above a base floor 20 by an array of pillars 18 which may be fastened to floor 20. A portion of assembly 12 is removed in FIG. 1 to show busway arrangement 14. Raised floor architectures, such as assembly 12, are conventional and commercially available.

Electrical power distribution busway arrangement 14 includes one or more busways 22, a feeder cable 24 associated with each busway 22, an end tap box 26 associated with each busway 22, module plug box 32, and supply cables (electrical conductors) 40. In general, electrical power from a power distribution unit 28 is provided to computers 38 (e.g. personal computers, mini computers, mainframe computers, certain computer peripherals) and other electrical devices 39 (e.g. lights, electric motors, electric resistance heaters). Additionally, as discussed in detail below, more than one type (i.e. different electrical characteristics) or quality of electrical power may be simultaneously provided to busway 22, where module plug boxes 32 are configured to insure that computers 38 and devices 39 utilize the electrical power effectively.

Electrical power is provided from unit 28 to busway 22 by feeder cable 24 and end tap box 26. Cable 24 is wired to unit 28 and box 26 such that when box 26 is electrically connected to the bus bars of busway 22, the bus bars may be energized by unit 28. Computers 38 and electrical devices 39 (e.g. printers) are supplied electrical power by supply cables 40 which are coupled between computers 38, devices 39 and module plug boxes 32. Boxes 32 include connectors 156 (FIGS. 5A-5C and 6) which are electrically engaged by connectors 35 of cables 40. Boxes 32 include plug prongs (discussed below) which engage certain of the bus bars of busway 22, allowing computers 38 and devices 39 to be provided with the appropriate quality of electrical power from busway 22. Cables 40 may be directly wired to an outlet 41, or a junction 43 may be provided to couple cables 40 to more than one outlet 41. Outlet 41 is of the conventional 120 volt outlet type. Further details relating to the structure of busway arrangement 14 are provided in the '258 application.

Figure 2:
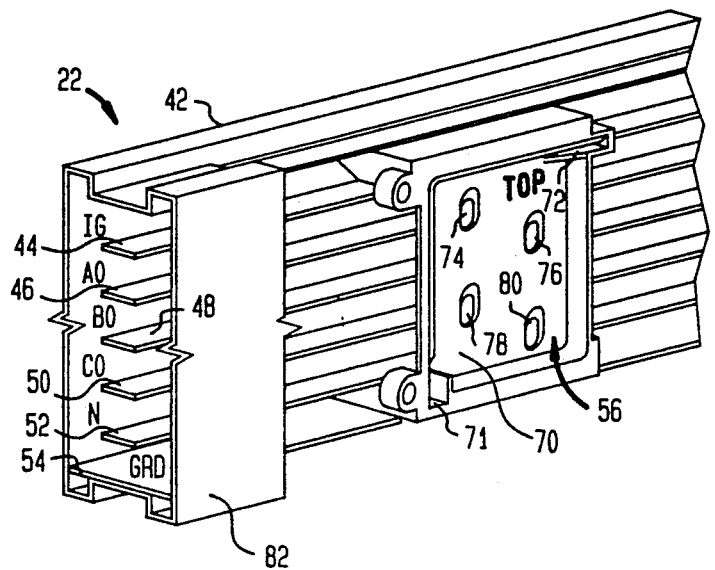
FIG. 2 is a partially cut-away, sectioned elevated perspective view of a portion of an electrical power distribution busway assembly.
Figure 3:
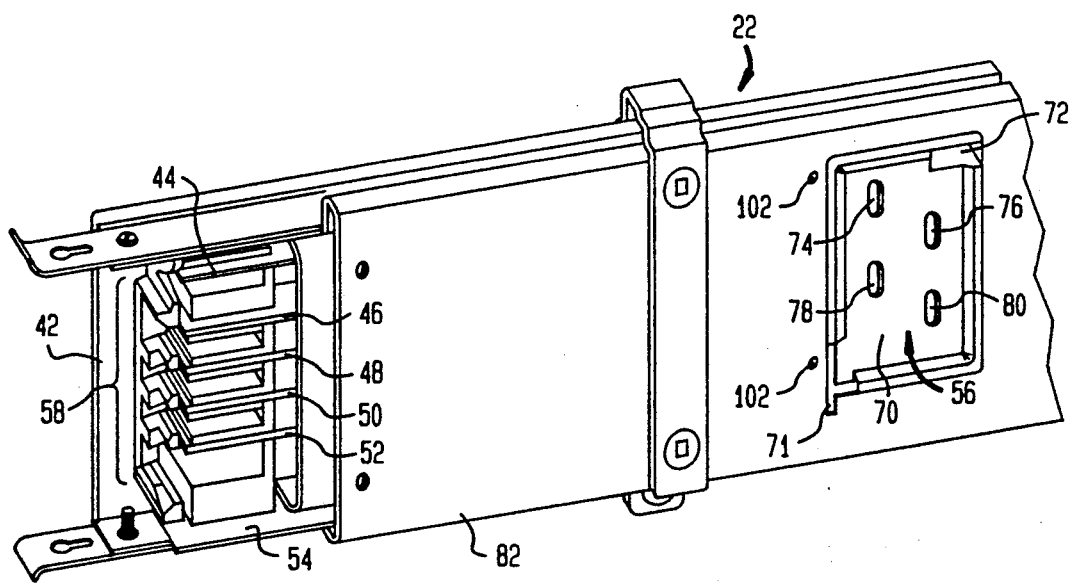
FIG. 3 is an elevated perspective view of a portion of the busway assembly.

Referring to FIGS. 2 and 3, busway 22 includes a housing 42 formed of sheet steel having a generally rectangular cross section, an isolated ground (or second neutral) bus bar 44, a first bus bar (A phase electrical conductor) 46, a second bus bar (B phase electrical conductor) 48, a third bus bar (C phase electrical conductor) 50, a neutral bus bar 52, a bonded ground bus bar 54 and a plurality of plug-in portions 56. Bus bars 44, 46, 48, 50 and 52 are positioned within housing 42 by a plurality of insulating spacers 58. Insulating spacers 58 (see FIG. 3) physically separate, and electrically insulate, bus bars 44, 46, 48, 50 and 52 from each other and housing 42. Insulting spacers 58 are molded to support and cooperate with bus bars 44, 46, 48, 50 and 52 and form receptacles adapted to accept plug prongs associated with the specific bus bar. More specifically, spacers 58 cooperate with isolated ground bus bar 44 to form an isolated ground prong receptacle 72, first bus bar 46 to form a first prong receptacle 74, second bus bar 48 to form a second prong receptacle 76, third bus bar 50 to form a third prong receptacle 78, neutral bus bar 52 to form a neutral prong receptacle 80, and grounded bus bar 54 to form a ground prong receptacle 71. Spacers 58 each include a cover portion 70 including an opening associated with each of receptacles 72, 74, 76, 78, 80 and 71.

Insulating spacers 58 are spaced within housing 42 such that plug-in portions 56 are available to provide a plurality of box 32 locations along busway 22 as illustrated in FIG. 1. By way of example only spacers 58 may be positioned such that plug-in portions 56 are located every 20 inches along busway 22.

Busway 22 also includes a housing cover 82 having openings which expose receptacle faces 70. Housing cover 82 extends the length of the sections of busway 22. Busway 22 is typically supported under floor assembly 12 with plug-in portions 56 facing up toward the bottom of floor assembly 12. Unfortunately, with this orientation open portions 56 may be exposed to debris falling from the raised floor. Accordingly, cover plates (not shown) may be fastened over unused portions 56. Further details concerning busway 22 are provided in the '094 application.

Power distribution unit 28 includes a distribution panel 29 with amp meters, filtering circuitry and an uninterruptable power supply 31. Unit 28 may selectively provide electrical power having different qualities to bus bars 46, 48 and 50 via feeder cable 24. More specifically, electrical power having a "high quality" may be provided to bus bar 50. This "high quality" electrical power may be provided by unit 28 through circuitry which provides filtering, isolation via an isolation transformer, and an uninterruptable power source. Bus bars 46 and 48 may be provided "low quality" electrical power by unit 28, where the "low quality" electrical power is not filtered, is not provided through isolation circuitry, and is not connected to an uninterruptable power supply. Additionally, a "medium quality" electrical power may be provided to one or more of bus bars 46, 48 or 50. The "medium quality" electrical power may be provided with less than all of the filtering circuitry, isolation circuitry, and uninterruptable power supply.

One advantage of selectively providing high, medium and low quality electrical power to bus bars 46, 48 and 50 is that not all of the equipment supplied with power from busway 22 requires high quality electrical power. For example, a computer 38 handling important information may require high quality electrical power, whereas a printer may only require low quality electrical power. Depending upon the use and application of busway 22, high, medium and low quality electrical power may be provided to bus bars 46, 48 and 50 in any of a number of ways. Additionally, as discussed in detail below, the prong arrangement and wiring of module plug box 32 are configured to provide the appropriate type of electrical power to computers 38 and devices 39.

Figure 4:
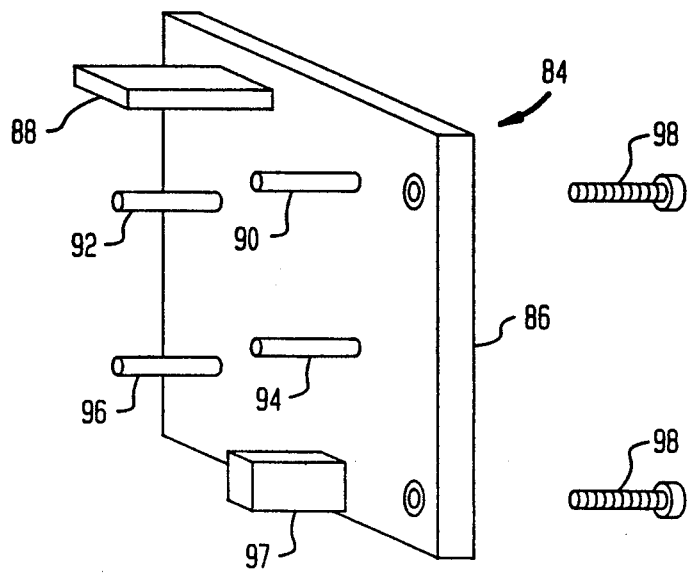
FIG. 4 is a schematic representation of a bus plug.

Referring to FIG. 4, a plug pronged portion 84 of module plug box 32 is schematically illustrated. Portion 84 includes a prong support 86, an isolated ground prong 88, a neutral prong 96, and a ground prong 97. Depending upon the application, portion 84 will include one of a first prong 90, a second prong 92, or a third prong 94. Prongs 88 and 97 have substantially rectangular cross sections and are arranged upon base 86 to engage isolated ground bus bar (second neutral) 44 and ground bus bar 54, respectively. Prongs 90, 92, 94 and 96 have a substantially circular cross section and are supported by support 86 such that they engage bus bars 46, 48, 50 and 52, respectively.

While portions 84 could include all of prongs 90, 92 and 94 regardless of the application, the presently preferred embodiment of portion 84 only includes one of prongs 90, 92 or 94 as required. This arrangement reduces the cost of portion 84 by eliminating unnecessary prongs, and also prevents in-field modifications of portions 84. More specifically, in-field modifications may result in an undesirable and inappropriate interchanging of power, ground and neutral connections.

Boxes 32 may be fastened to busway 22, subsequent to engagement of prongs 88, 90, 92, 94, 96 and 98 with their respective bus bars, by a pair of screws 98 which pass through holes 100 in base 86 to engage holes 102 in housing cover 82. Housing 42 and cover 82 are both fabricated from an electrically conductive material such as sheet metal, and ground bus bar 54 is electrically coupled to housing 42.

Figure 5A:
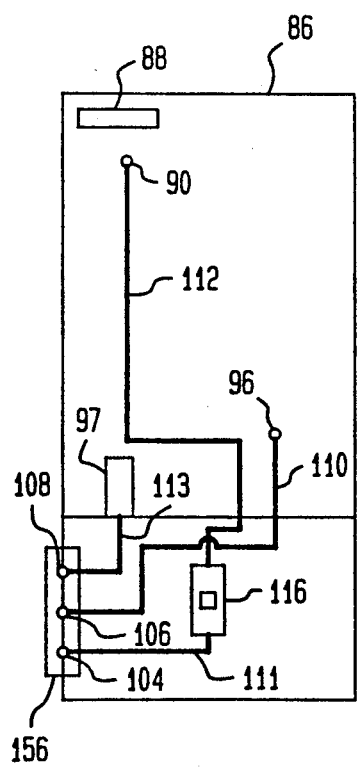
FIG. 5A is a schematic representation of a first wiring configuration of the bus plug.
Figure 5B:
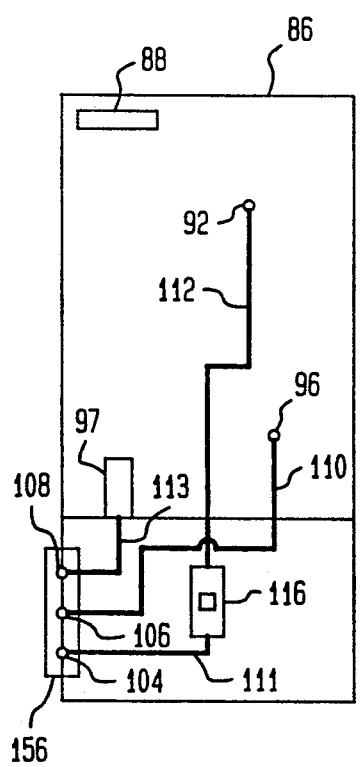
FIG. 5B is a schematic representation of a second wiring configuration of the bus plug.
Figure 5C:
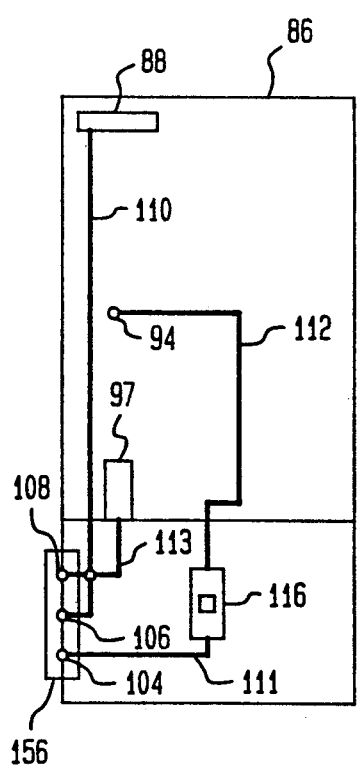
FIG. 5C is a schematic representation of a third wiring configuration of the bus plug.

Referring to FIGS. 5A, 5B, and 5C, three prong arrangements for module plug box 32 are illustrated. Box 32 includes a plug connection 156 having a power terminal 104, a neutral terminal 106, and a ground terminal 108. Box 32 also includes a single pole circuit breaker 116 having, for example, a rating of 5 to 20 amps. In the first prong arrangement (FIG. 5A), neutral bus bar 52 will be connected to neutral terminal 106 via prong 96 and conductor 110; power bus bar 46 will be connected to power terminal 104 via circuit breaker 116, conductor 111, conductor 112 and prong 90; and ground bus bar 54 will be connected to ground terminal 108 via prong 97 and conductor 113.

In the second prong arrangement (FIG. 5B), neutral bus bar 52 will be connected to neutral terminal 106 via prong 96 and conductor 110; power bus bar 48 will be connected to power terminal 104 via circuit breaker 116, conductor 111, conductor 112 and prong 92; and ground bus bar 54 will be connected to ground terminal 108 via prong 97 and conductor 113.

In the third prong arrangement (FIG. 5C), isolated ground bus bar 44 will be connected to neutral terminal 106 via prong 88 and conductor 110; power bus bar 50 will be connected to power terminal 104 via circuit breaker 116, conductor 111, conductor 112 and prong 94; and ground bus bar 54 will be connected to ground terminal 108 via prong 97 and conductor 113. Of course, depending upon the application, more that three prong and wiring arrangements may be provided depending upon the specific application.

Referring again to FIG. 1, connectors 35, located at the first ends of cables 40, are configured to mate with plug connection 156 and provide neutral, ground and power potentials to the neutral, ground and power conductors of cables 40. The second ends of cables 40 are connected to outlets 41 either directly, or via junctions 43, such that the neutral, ground and power conductors are appropriately coupled to neutral, ground and power terminals of outlets 41.

For a given application, the plug configurations of FIGS. 5A and 5B may be used for boxes 32 arranged to provide a low quality power to relatively insensitive devices 39 such as printers, whereas the plug configuration of FIG. 5C is used for boxes 32 arranged to provide high quality power to sensitive devices such as computers 38. As discussed above, power bus bars 46 and 48 are provided with low quality power, bus bar 50 is provided with high quality power, and bus bar 44 is isolated from neutral bus bar 52. Accordingly, by using the plug configurations of FIGS. 5A, 5B and 5C:

low quality power is provided to devices 39;
high quality power is provided to computers 38; and
neutral potentials provided to computers 38 are isolated from the neutral potentials provided to devices 39.

As is apparent, this arrangement allows busway 22 to selectively and simultaneously provide different qualities of electrical power (e.g. high and low) to computers 38 and devices 39, thereby reducing the size and cost of the circuitry required to provide high quality power to a given office area. Additionally, this arrangement allows box 32 to selectively and simultaneously provide a neutral potential (bus bar 44) to computers 38 which is isolated from the neutral potential (bus bar 52) provided to devices 39. The isolated neutral potential minimizes the exposure of computer 38 to damaging voltage levels (spikes, harmonics, etc.) which may be produced on neutral bus bar 52 by other devices 39 (electric motors) connected to neutral bus bar 52.

Figure 6:
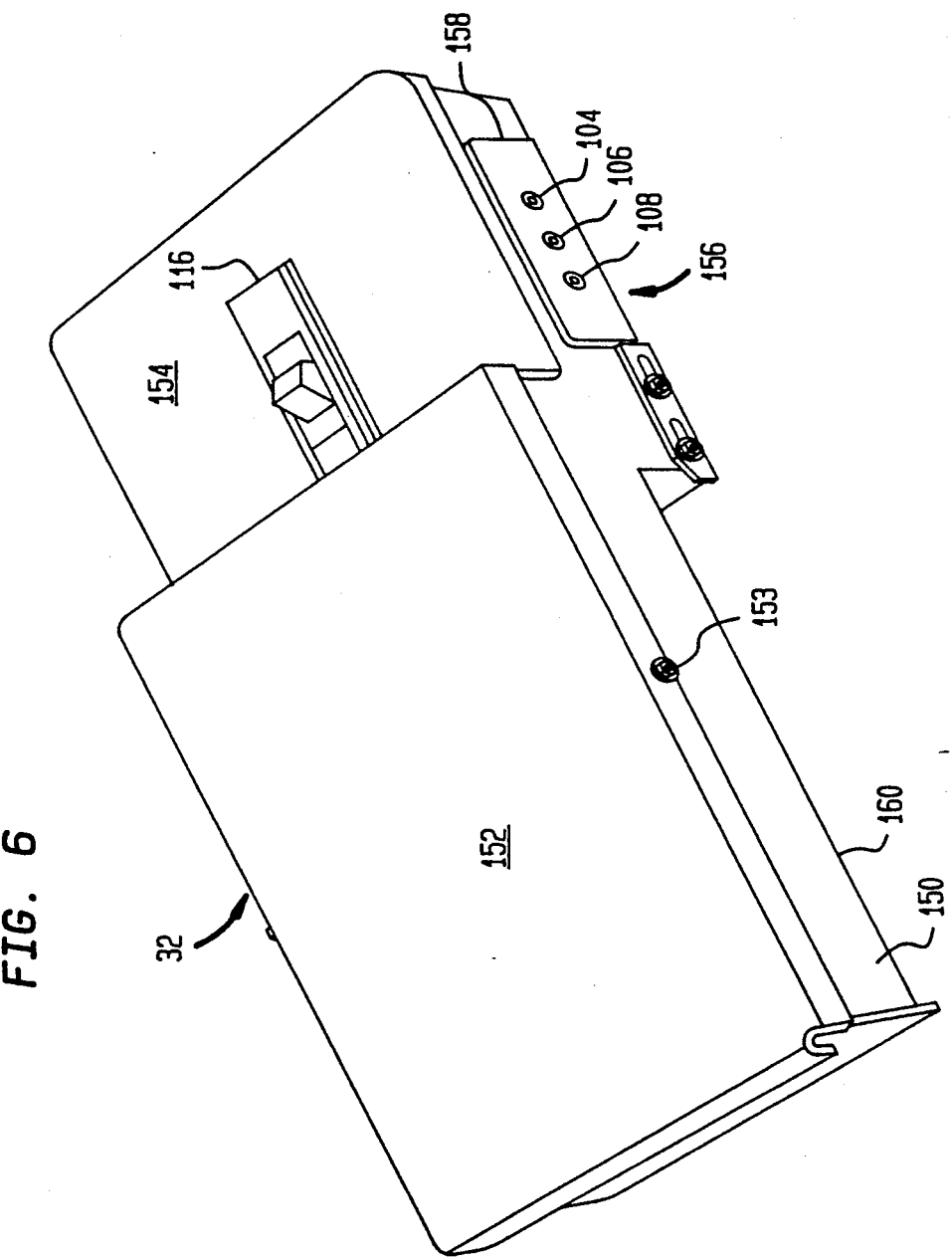
FIG. 6 is a perspective view of a bus plug housing.

Referring to FIG. 6, module plug box 32 is illustrated in further detail. Box 32 includes a housing 150, a first housing cover 152, a second housing cover 154, and a plug connection 156. The circuitry of FIGS. 5A–5C, including circuit breaker 116, is enclosed within housing 150. Cover 152 is fastened to housing 150 over a portion of the circuit breaker with fasteners 153. Cover 154 includes an opening, through which circuit breaker 116 is accessible, and covers the remaining portion of the circuitry. Terminals 104, 106 and 108 of connection 156 are accessible through an opening 158 in the side of housing 150. Plug portion 84 is not shown in FIG. 6, but is supported by housing 150 at a bottom side 160 of housing 150. By way of example only, housing 150 may be fabricated from sheet metal.

The preferred embodiment of the present invention has been disclosed by way of example, and it will be understood that other modifications may occur to those skilled in the art without departing from the scope and spirit of the appended claims.

What is claimed is:

1. An electrical power distribution arrangement comprising:
   a busway including a first power conductor and a second power conductor;
   a power supply unit electrically coupled to the busway such that a first quality electrical power is supplied to the first power conductor and a second quality electrical power is supplied to the second power conductor;
   first and second electrical conductors; and
   first and second plugs selectively configured to engage the busway, where the first plug couples the first electrical conductor to the first power conductor, and the second plug couples the second electrical conductor to the second power conductor.

2. The arrangement of claim 1, where the power supply unit comprises:
   an uninterruptable power source; and
   a filtering circuit.

3. The arrangement of claim 1, where the first quality electrical power is filtered and uninterruptable.

4. The arrangement of claim 3, further comprising a computer station electrically coupled to the first electrical conductor.

5. The arrangement of claim 1, where the busway include an elongate metal housing having a substantially rectangular cross-section, a first neutral bus, and a second neutral bus electrically isolated from the first neutral bus.

6. An electrical power distribution arrangement comprising:
   a busway including a first neutral conductor and a second neutral conductor;
   a power supply unit electrically coupled to the busway, where the first neutral conductor is isolated from the second neutral conductor such that the potential of the second neutral may deviate from the potential of the first neutral;
   first and second electrical conductors; and
   first and second plugs selectively configured to engage the busway, where the first plug couples the first electrical conductor to the first neutral, and the second plug couples the second electrical conductor to the second neutral.

7. The arrangement of claim 6, where the power supply unit comprises:
   an uninterrupted power source; and
   a filtering circuit.

8. The arrangement of claim 6, further comprising a computer station electrically coupled to the second electrical conductor.

9. The arrangement of claim 6, where the busway includes an elongate metal housing having a substantially rectangular cross-section, a first power conductor for carrying a first quality of electrical power and a second power conductor for carrying a second quality of electrical power.

10. In a computer facility of the type having a raised floor supported above a base floor to provide a space therebetween, the improvement comprising:
    at least one substantially horizontal busway mounted in the space, the busway including a first power conductor and a second power conductor;
    a. power supply unit electrically coupled to the busway such that a first quality electrical power is supplied to the first power conductor and a second quality electrical power is supplied to the second power conductor;
    first and second electrical conductors; and
    first and second plugs selectively configured to engage the busway, where the first plug couples the first electrical conductor to the first power conductor, and the second plug couples the second electrical conductor to the second power conductor.

11. The arrangement of claims 10, where the power supply unit comprises:
    an uninterruptable power source; and
    a filtering circuit.

12. The arrangement of claim 10, where the first quality electrical power is filtered and uninterruptable.

13. The arrangement of claim 12, further comprising a computer station electrically coupled to the first electrical conductor.

14. The arrangement of claim 10, wherein the busway includes an elongate metal housing having a substantially rectangular cross-section, a first neutral bus, and a second neutral bus electrically isolated from the first neutral bus.

15. In a computer facility of the type having a raised floor supported above a base floor to provide a space therebetween, the improvement comprising:
    at least one substantially horizontal busway mounted in the space, the busway including a first neutral conductor and a second neutral conductor;
    a power supply unit electrically coupled to the busway, where the first neutral conductor is isolated from the second neutral conductor such that the potential of the second neutral may deviate from the potential of the first neutral;
    first and second electrical conductors; and
    first and second plugs selectively configured to engage the busway, where the first plug couples the first electrical conductor to the first neutral, and the second plug couples the second electrical conductor to the second neutral.

16. The arrangement of claim 15, where the power supply unit comprises:
    an uninterruptable power source; and
    a filtering circuit.

17. The arrangement of claim 15, further comprising a computer station electrically coupled to the second electrical conductor.

18. The arrangement of claim 15, where the busway includes an elongate metal housing having a substantially rectangular cross-section, a first power conductor for carrying a first quality of electrical power and a second power conductor for carrying a second quality of electrical power.

19. An electrical power distribution arrangement comprising:
   a busway including a housing, a first ground conductor and a second ground conductor;
   a power supply unit electrically coupled to the busway, where the housing and the first ground conductor are electrically engaged and have the same potential, and the second ground conductor is electrically isolated from the housing such that the potential of the second ground may deviate from the potential of the first ground;
   first and second electrical conductors; and
   first and second plugs selectively configured to engage the busway, where the first plug couples the first electrical conductor to the first ground, and the second plug couples the second electrical conductor to the second ground.

20. The arrangement of claim 19, where the power supply unit comprises:
   an uninterruptable power source; and
   a filtering circuit.

21. The arrangement of claim 19, further comprising a computer station electrically coupled to the second electrical conductor.

22. The arrangement of claim 19, where the busway includes an elongate metal housing having a substantially rectangular cross-section, a first power conductor for carrying a first quality of electrical power and a second power conductor for carrying a second quality of electrical power.

23. In a computer facility of the type having a raised floor supported above a base floor to provide a space therebetween, the improvement comprising:
   at least one substantially horizontal busway mounted in the space, the busway including a housing, a first ground conductor and a second ground conductor;
   a power supply unit electrically coupled to the busway, where the housing and the first ground conductor are electrically engaged and have the same potential, and the second ground conductor is electrically isolated from the housing such that the potential of the second ground may deviate from the potential of the first ground;
   first and second electrical conductors; and
   first and second plugs selectively configured to engage the busway, where the first plug couples the first electrical conductors to the first ground, and the second plugs couples the second electrical conductors to the second ground.

24. The arrangement of claim 23, where the power supply unit comprises:
   an uninterruptable power source; and
   a filtering circuit.

25. The arrangement of claim 23, further comprising a computer station electrically coupled to the second electrical conductor.

26. The arrangement of claim 23, where the busway includes an elongate metal housing having a substantially rectangular cross-section, a first power conductor for carrying a first quality of electrical power and a second power conductor for carrying a second quality of electrical power.

* * * * *